United States Patent
Nakamura et al.

(10) Patent No.: US 8,419,119 B2
(45) Date of Patent: Apr. 16, 2013

(54) SUNSHADE DEVICE

(75) Inventors: Teruyuki Nakamura, Tochigi (JP); Tsutomu Iwaya, Tochigi (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 0 days.

(21) Appl. No.: 13/271,619

(22) Filed: Oct. 12, 2011

(65) Prior Publication Data

US 2012/0098301 A1     Apr. 26, 2012

(30) Foreign Application Priority Data

Oct. 26, 2010 (JP) .................................. 2010-239809
Oct. 26, 2010 (JP) .................................. 2010-239818

(51) Int. Cl.
*B60J 7/043* (2006.01)
(52) U.S. Cl.
USPC .......................... 296/214; 160/265; 160/268.1
(58) Field of Classification Search ................. 296/214; 160/263–273.1
See application file for complete search history.

(56) References Cited

U.S. PATENT DOCUMENTS

| 7,798,568 B2 * | 9/2010 | Keller ............................ 296/214 |
| 2008/0142172 A1 | 6/2008 | Hansen et al. |
| 2010/0032991 A1 | 2/2010 | Keller |
| 2010/0170645 A1 | 7/2010 | Lin |

FOREIGN PATENT DOCUMENTS

| DE | 10 2008 012 202 A1 | 9/2009 |
| DE | 10 2008 035 514 A1 | 2/2010 |
| EP | 1 923 245 A2 | 5/2008 |
| EP | 2 230 115 A1 | 9/2010 |
| JP | 63-258213 | 10/1988 |
| JP | 2009-090743 | 4/2009 |
| JP | 2010-036898 | 2/2010 |
| WO | 2010/022768 A1 | 3/2010 |

OTHER PUBLICATIONS

European Search Report application No. 11185082.2 dated Dec. 29, 2011.

* cited by examiner

*Primary Examiner* — Dennis Pedder
(74) *Attorney, Agent, or Firm* — Squire Sanders (US) LLP

(57) ABSTRACT

A sunshade device includes a pair of shade guide rails across an indoor opening; a shade of which opposite side edges are guided by the shade guide rails; and a winding shaft rolling up the shade, wherein the opposite side edges of the shade are guided by the shade guide rails with the side edges being folded after a folding stroke whose folded width is gradually increased toward a front end of the shade when the shade is drawn out from the winding shaft, each of the opposite side edges of the shade is provided with a folded introduction part formed by folding a side edge portion of the shade and connecting the folded side edge portion to a main body portion of the shade, and the folded introduction part is formed in a predetermined length from the front end of the shade in an open/close direction of the shade.

7 Claims, 11 Drawing Sheets

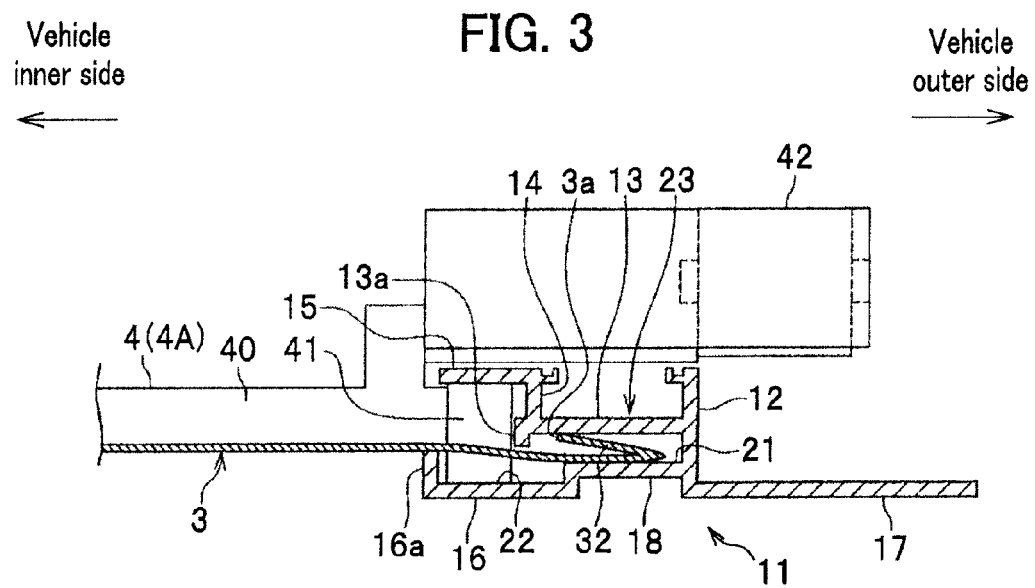

SUNSHADE DEVICE

CROSS REFERENCE TO RELATED APPLICATION

The application claims the foreign priority benefit under Title 35, United States Code, §119(a)-(d) of Japanese Patent Application No. 2010-239809, filed on Oct. 26, 2010 and Japanese Patent Application No. 2010-239818, filed on Oct. 26, 2010, the contents of which are hereby incorporated by reference.

BACKGROUND OF THE INVENTION

1. Field of the Invention

The present invention relates to a sunshade device which is provided to a fixed roof of a vehicle.

2. Description of the Related Arts

A sunshade device has been known which takes in or shields sunlight from an indoor opening of a vehicle. For example, Unexamined Japanese Patent Application Publication No. 2010-36898 discloses a sunshade device in which a shade for shielding sunlight is wound around the winding shaft like a roll.

The sunshade device disclosed in Unexamined Japanese Patent Application Publication No. 2010-36898 is mainly comprised of a pair of shade guide rails which is provided on opposite sides of an indoor opening of a vehicle in the width direction of the indoor opening, a shade whose opposite side edges are guided by the shade guide rails and a winding shaft which winds the shade. In Unexamined Japanese Patent Application Publication No. 2010-36898, a technique is disclosed in which the opposite side edges of the shade are folded and guided by the shade guide rail when the shade is drawn out from the winding shaft.

In accordance with this technique, by folding the side edge of the shade the restoring force of the side edge of the shade to return to its original state is exerted continuously over the entire folded part. Therefore, even if a part of the side edge of the shade is likely to be removed from the shade guide rail, for example, by the external force applied to the shade, the restoring force exerted around the part of the shade likely to be removed acts to pull the side edge of the shade 3 to return to the shade guide rail 2. Thus, the side edge of the shade 3 is difficult to be removed from the shade guide rail 2.

In the conventional shade device, however, there has been a problem that a work for assembling the shade to the shade guide rail is complicated because when the shade is assembled to the shade guide rail, the opposite side edges of the shade must be inserted into a pair of shade guide rails with the opposite side edges of the shade being kept folded after the opposite side edges of the front end of the shade are folded. Further, there has been another problem that if a part of the side edge of the shade is removed from the shade guide rail due to external force, a work for restoring the shade is complicated.

SUMMARY OF THE INVENTION

The present invention has been made in view of the above problems, and an object thereof is to provide a sunshade device in which the assembling work and the restoring work of the shade are easy.

A first aspect of the present invention provides a sunshade device which is provided to a fixed roof of a vehicle, the sunshade device including: a pair of shade guide rails which is provided on opposite sides of the sunshade device across an indoor opening of the fixed roof; a shade of which opposite side edges are guided by the shade guide rails to open or close the indoor opening; and a winding shaft which rolls up the shade, wherein each of the opposite side edges of the shade is guided by the shade guide rail with the side edge being folded through a folding stroke whose folded width is gradually increased toward a leading end of the shade when the shade is drawn out from the winding shaft, the each of the opposite side edges of the shade is provided in advance with a folded introduction part that is formed by folding a side edge portion of the shade and connecting the folded side edge portion to a main body portion of the shade, and the folded introduction part is formed in a predetermined length from the leading end of the shade in an open/close direction of the shade.

In the aforementioned sunshade device, it is preferable that a folded line for folding the side edge portion of the shade is formed on each opposite side of the main body portion of the shade, and the folded line is formed in the open/close direction of the shade.

In the aforementioned sunshade device, it is preferable that the folded introduction part is formed by sewing the side edge portion of the shade and the main body portion of the shade together.

In the aforementioned sunshade device, it is preferable that the shade guide rail includes a groove portion accommodating a folded portion which is formed by folding the shade and the groove portion includes a rib portion which extends in a vertical direction at a position inside of the vehicle relative to the folded portion.

In the aforementioned sunshade device, it is preferable that the aforementioned sunshade device further includes: a handle which is attached to the leading end of the shade and includes slide shoes which are slid in the shade guide rails; and multifunctional stoppers which are provided at ends of the shade guide rails on an opening side of the shade, wherein each of the multifunctional stopper includes a restriction portion which comes in contact with the handle at a completely-opened position of the shade and a base body portion including a folding guide groove through which the folded side edge of the shade is inserted, the folding guide groove being communicated with a groove portion of the shade guide rail, and wherein a height of an opening of the folding guide groove on the opening side of the shade is larger than a height of the groove portion.

In the aforementioned sunshade device, it is preferable that the main body portion includes a bottom portion which forms a lower portion of the folding guide groove, wherein the bottom portion being inclined downward toward the opening side of the shade.

In the aforementioned sunshade device, it is preferable that the height of the opening of the folding guide groove on the closing side of the shade is smaller than the height of the groove portion.

BRIEF DESCRIPTION OF THE DRAWINGS

FIG. 3 is a cross sectional view of the sunshade device along the line I-I in FIG. 1.

DETAILED DESCRIPTION OF THE PREFERRED EMBODIMENT

Figure 1:
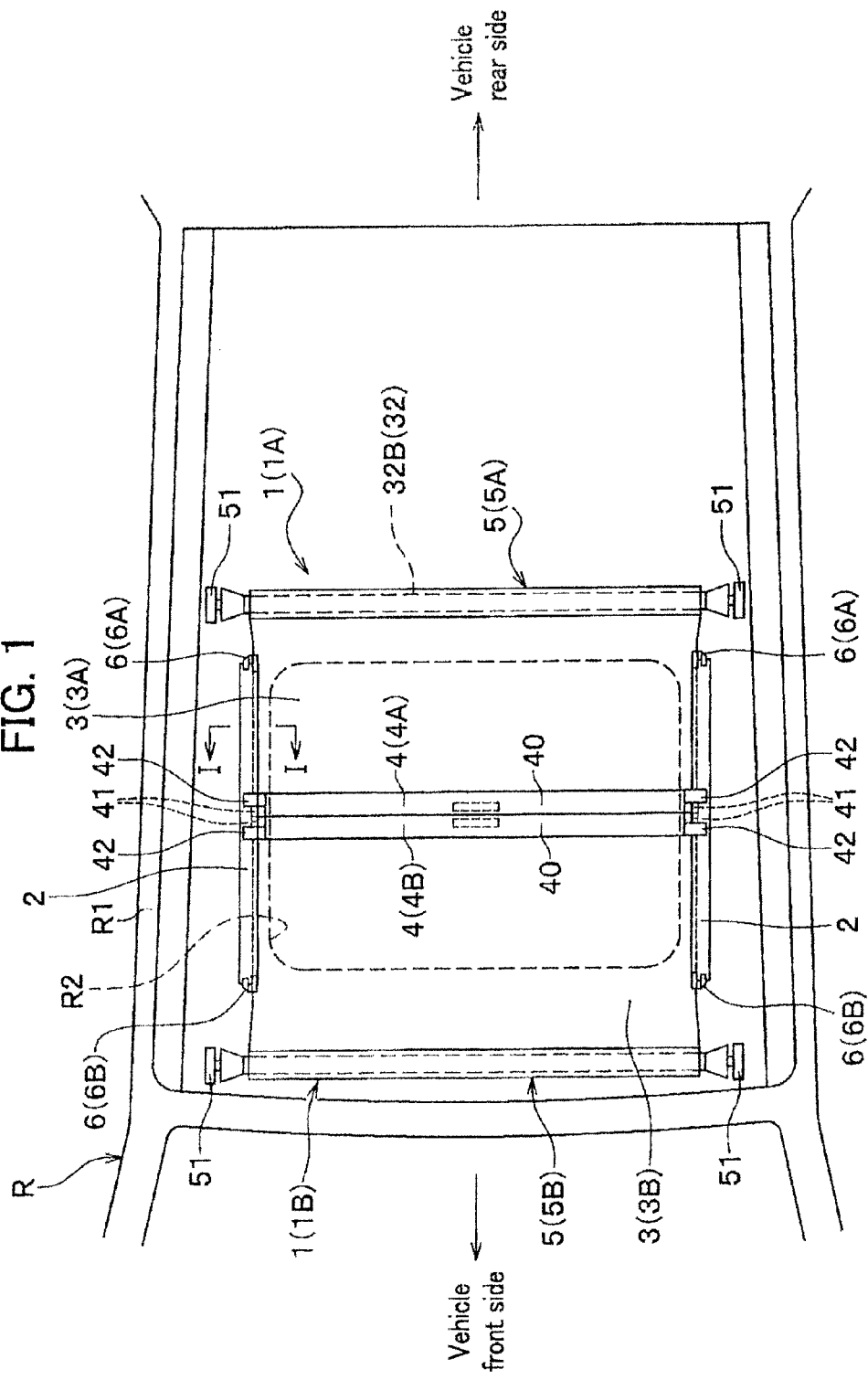
FIG. 1 is a schematic plain view showing a sunshade device according to an embodiment of the present invention.
Figure 2:
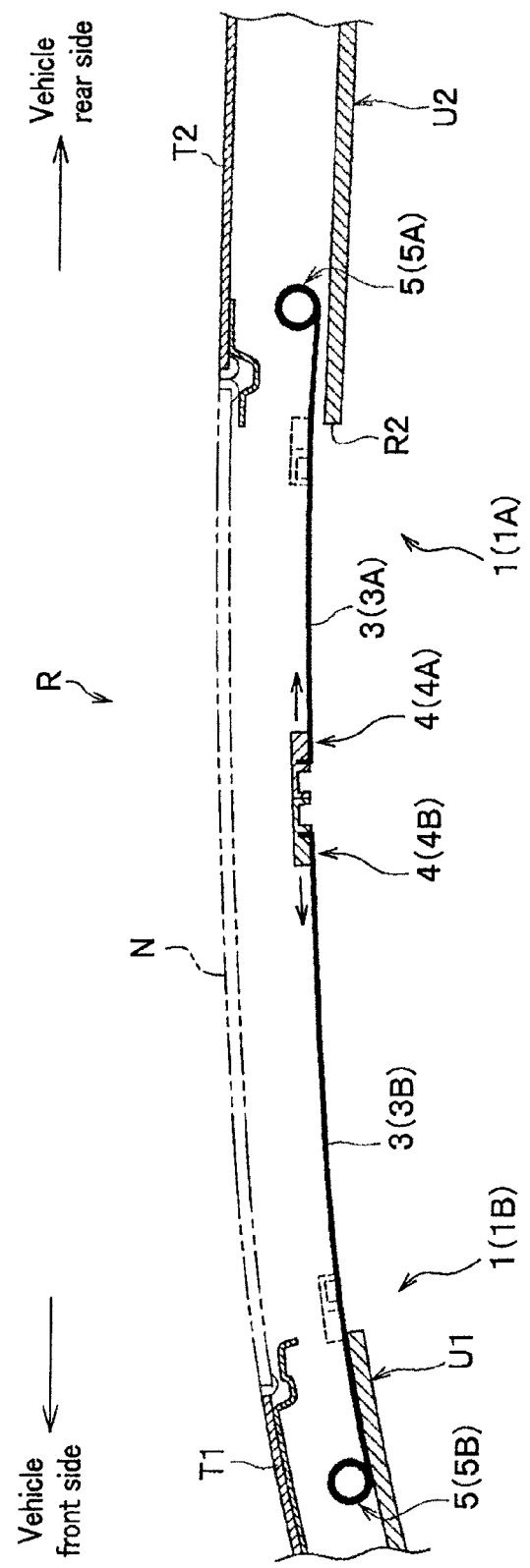
FIG. 2 is a side cross sectional view of the sunshade device shown in FIG. 1.

An embodiment of the present invention is described in detail below with reference to the accompanying drawings. As shown in FIGS. 1 and 2, a sunshade device 1 according to the embodiment is a device which is provided to a fixed roof R1 of a vehicle R for taking in or shading light coming through an indoor opening R2.

A vehicle R according to the embodiment includes a sunshade device 1A which is provided on the rear side of the vehicle R and a sunshade device 1B which is provided on the front side of the vehicle R. The sunshade devices 1A, 1B share a shade guide rail 2 and are arranged substantially symmetrical in the vehicle front-rear direction. The sunshade devices 1A, 1B opens or closes the indoor opening R2 in a double door manner.

A sunroof panel N which is opened or closed in response to the operation of passengers is provided above the sunshade devices 1A, 1B as shown in FIG. 2. The sunroof panel N is adapted to be tilted up or tilted down to be moved in the front-rear direction of the vehicle. A symbol T1 represents a front garnish and a symbol T2 represents a fixed panel. Symbols U1, U2 represent roof linings.

Since the sunshade devices 1A, 1B are substantially the same structure except their arranged direction, only the sunshade device 1A arranged on the rear side of the vehicle is described as an example.

As shown in FIG. 1, the sunshade device 1(1A) includes a pair of shade guide rails 2 arranged on opposite sides of the indoor opening R2 in a vehicle width direction, a shade 3 which covers the upper side of the indoor opening R2; a handle 4 which is provided on the leading end of the shade 3; a winding shaft 5 which delivers or winds the shade 3; and multi functional stoppers 6 which are attached to ends of the pair of the shade guide rails 2.

The shade guide rail 2 is an aluminum alloy extruded member and guides the shade 3 in the front-rear direction. The shade guide rail 2 is formed longer than the length of the indoor opening R2 in the front-rear direction. The opposed shade guide rails 2, 2 are arranged in parallel.

As shown in FIG. 3, the shade guide rail 2 includes a bottom plate portion 11, an outer wall portion 12, a middle plate portion 13, an inner wall portion 14 and an upper plate portion 15. The bottom plate portion 11 includes a first bottom plate portion 16, a second bottom plate portion 17 and a third bottom plate portion 18. The third bottom plate portion 18 is arranged between the first bottom plate portion 16 and the second bottom plate portion 17 and is formed a step upper than the first bottom plate portion 16 and the second bottom plate portion 17. A rib portion 16a is formed at the vehicle inner side end of the first bottom plate portion 16.

The outer wall portion 12 is vertically erected on the second bottom plate portion 17. The middle plate portion 13 extends from the outer wall portion 12 toward the vehicle inner side and is perpendicular to the outer wall portion 12. Provided at the inner side end of the middle plate portion 13a is a rib portion 13a extending in the front-rear direction of the vehicle and protruded downward from the inner side end of the middle plate portion 13a.

The inner wall portion 14 is vertically erected on a vehicle inner side part of the middle plate portion 13. The height position of the upper end of the inner wall portion 14 is substantially the same as that of the upper end of the outer wall portion 12. The upper plate portion 15 extends toward the vehicle inner side from the upper end of the inner wall portion 14 and is perpendicular to the inner wall portion 14.

The third bottom plate portion 18, the outer wall portion 12 and the middle plate portion 13 constitute a groove portion 21. The groove portion 21 is a part in which a fold part 32 formed by folding the side edge of the shade 3 is inserted. The first bottom plate portion 16, the upper plate portion 15 and the inner wall portion 14 constitute a sliding part 22. The sliding part 22 is a part along which a slide shoo 41 described later is slid. Further, the middle plate portion 13, the outer wall portion 12 and the inner wall portion 14 constitute an engaging groove 23. The engaging groove 23 is a part with which a third engaging portion 62c (described later) is engaged. The rib portion 13a is a protrusion for preventing the fold part 32 of the shade 3 from being removed toward the vehicle inner side.

The rib portion 13a extends vertically downward at the vehicle inner side relative to the fold part 32 of the shade 3 as shown in FIG. 3. Thus, the height of the groove portion 21 on the vehicle inner side becomes smaller, whereby the shade 3 is prevented from being removed in the vehicle inner side. If the side edge portion 3a is configured to be folded downward, the rib portion may be adapted to vertically extend upward from the bottom plate portion 11.

The shade 3 is a thin screen and is comprised of a member which shades light. The shade 3 is formed in a width larger than that of the indoor opening R2 as shown in FIG. 1. The handle 4 is provided at the leading end of the shade 3. A base end of the shade 3 is fixed to the winding shaft 5 and is wound like a roll around the winding shaft 5.

Figure 4A:
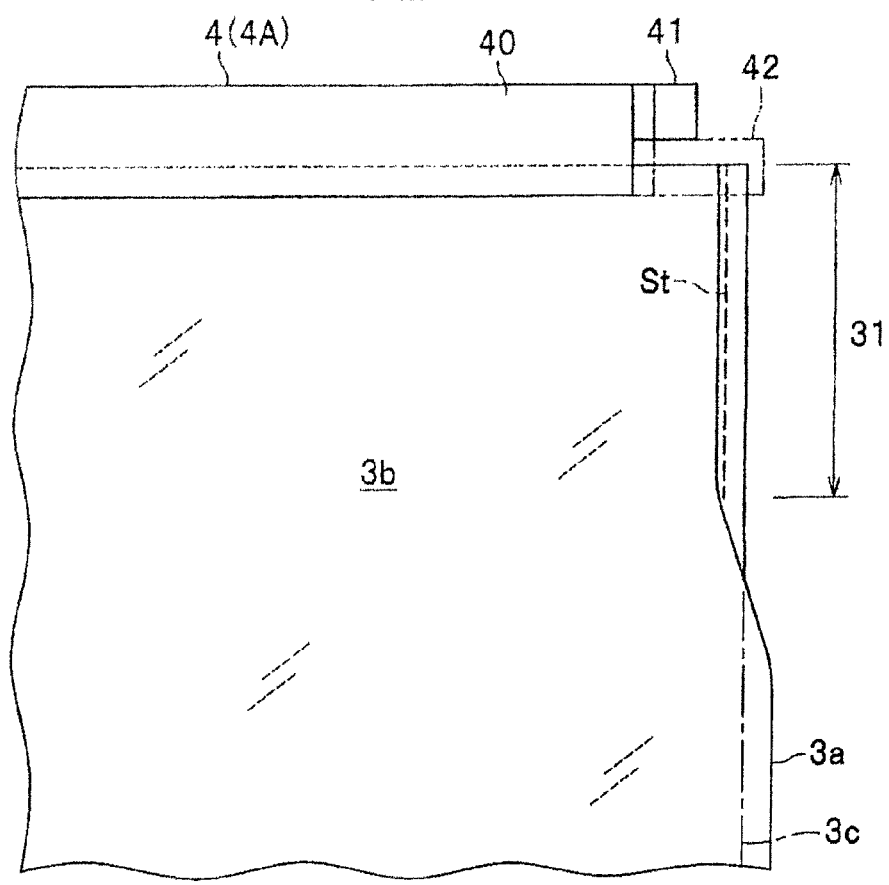
FIG. 4A is a plain view showing a leading end of the shade and a part around the leading end after the leading end is folded.
Figure 4B:
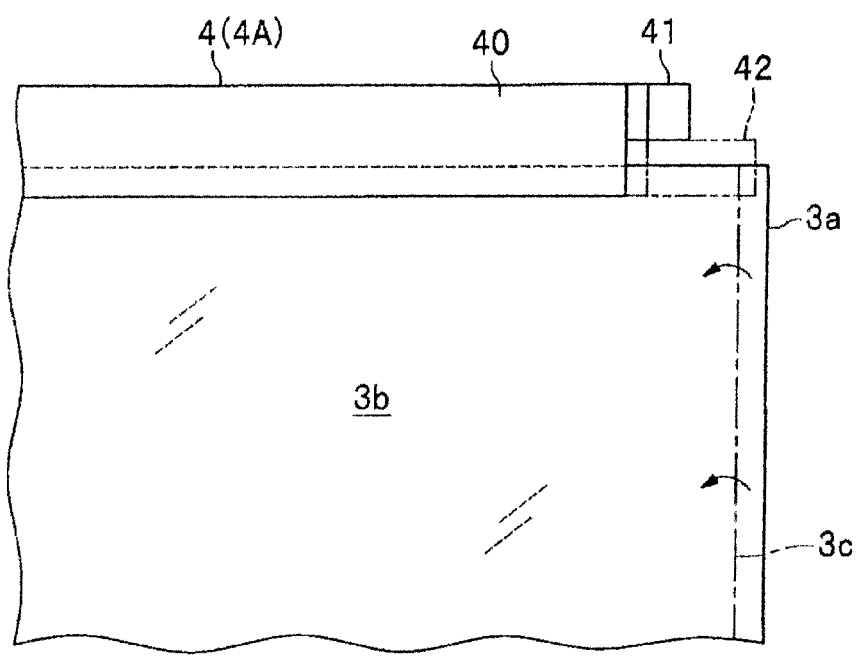
FIG. 4B is a plain view showing a leading end of the shade and a part around the leading end before the leading end is folded.

As shown in FIG. 4A, the shade 3 includes at the opposite side edges of the shade 3 folded introduction parts 31 each of which is formed by folding back the side edge portion 3a. As shown in FIG. 4B, the folded introduction part 31 is formed such that the side edge portion 3a of the shade 3 is folded back in the width of 5 mm to 2 cm, for example, and the fold part of the side edge portion 3a is sewn to a main body 3b. As the side edge portion 3a and the main body 3b can be connected solidly by sewing the side edge portion 3a and the main body 3b, the durability of the folded introduction part 31 can be enhanced.

Dashed line indicated by the symbol St represents stitches. The folded introduction part 31 is formed in parallel to the front-rear direction axis from the leading end of the shade 3 in the opening and closing direction of the shade 3 (the front-rear direction in the embodiment). The length of the seam allowance is not limited to be a particular length, however, it is preferable to be in a range of 3 cm to 15 cm. In FIGS. 4A and 4B, a supporting bracket 42 is shown in alternate long and two short dashes lines for the purpose of the explanation.

A fold line 3*c* is formed in parallel with the side edge portion 3*a* on the side portion of the main body 3*b*. The fold line 3*c* is a folding trace which is formed by folding the side edge portion 3*a*. By forming the fold line 3*c* in advance, the folding width of the side edge portion 3*a* can be made constant when the shade 3 is inserted into the shade guide rail 2.

The side edge portion 3*a* of the shade 3 and the main body 3*b* are sewn in the embodiment, however, the connection method is not limited to this. For example, the side edge portion 3*a* and the main body 3*b* may be connected (bonded) with a stapler, an adhesive agent or a double faced tape or the like.

The handle 4 is a resin member which is attached to the leading end side of the shade 3 and is a part used as a handle when the shade 3 is opened or closed. The handle 4 extends in parallel with the width direction axis of the shade 3. As shown in FIG. 2, the handle 4A of the sunshade device 1A and the handle 4B of the sunshade device 1B come in contact with each other when the shade is closed completely. The part shown in dashed lines in FIG. 2 indicates the positions of the handle 4A and 4B when the shade 3 is completely opened.

The handle 4 includes a base 40 which extends in the width direction; slide shoes 41 which are provided at opposite side ends of the base 40; and supporting brackets 42 which are adjacent to the slide shoes 41 at opposite side ends of the base 40 as shown in FIGS. 1 and 3.

The slide shoo 41 is slid in the sliding part 22 in the vehicle front-rear direction (opening and closing direction) by force applied to the handle 4. The slide shoo 41 may be any shape as long as the slide shoo 41 can be stably slid in the sliding part 22. The slide shoo 41 is slid in the sliding part 22 in the embodiment, however, the slide shoo 41 may be slid in the groove portion 21.

The supporting bracket 42 is protruded from the base 40 toward the vehicle outer side at the rear side of the vehicle relative to the slide shoo 41 (on a shade opening side) as shown in FIGS. 1 and 3. The supporting bracket 42 functions as "a contact portion" (see FIG. 11) which comes in contact with the multi functional stopper 6 when the shade 3 is completely opened in the embodiment. The supporting bracket 42 moves integrally with the base 40 above the shade guide rail 2. The supporting bracket 42 is a member supporting a drum which is a part of a holding mechanism for holding the shade 3 at an arbitrary opening position. Description on the holding mechanism for holding the shade 3 at an arbitrary opening position is omitted since the holding mechanism is not within a spirit of the present invention.

The winding shaft 5 is a member for winding the shade 3 like a roll and is provided in parallel with the width direction axis of the shade 3 as shown in FIGS. 1 and 2. The opposite ends of the winding shaft 5 in its width direction are rotatably supported by the fixed roof R1 via holders 51.

Figure 5:
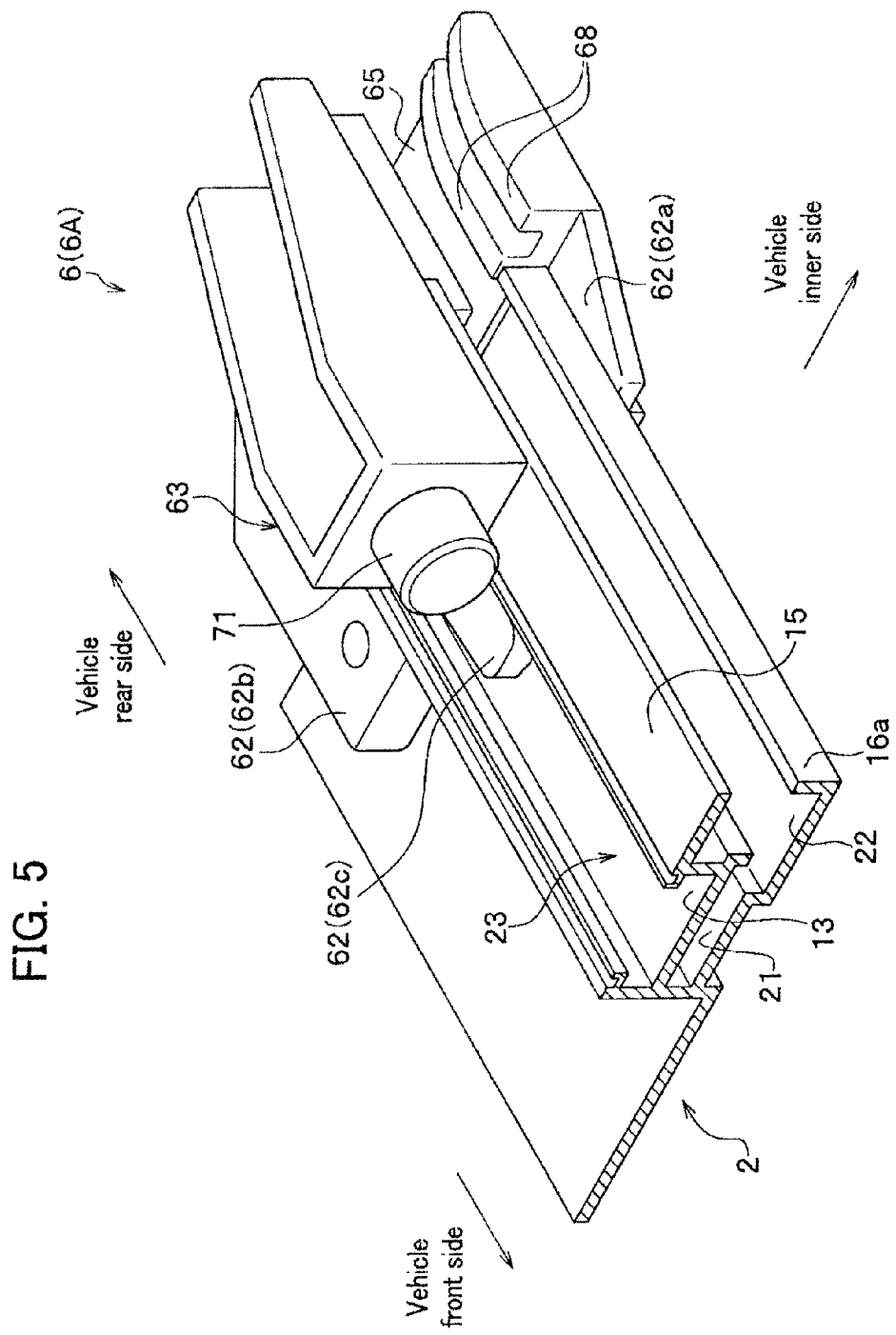
FIG. 5 is a perspective view showing a multifunctional stopper which is mounted on a shade guide rail.

The multi functional stopper 6 is a member which restricts the movement of the shade 3 when the shade 3 is completely opened and guides the folding of the side edge of the shade 3. The multi functional stopper 6 is formed, for example, of a resin mold. The multi functional stopper 6 is attached to the rear end of the shade guide rail 2 (the end of the shade guide rail 2 on the opening side of the shade) as shown in FIG. 5. More specifically, as shown in FIG. 1, the multi functional stoppers 6A, 6A according to the sunshade device 1A are attached to the rear ends of the shade guide rails 2 (the ends of the shade guide rails 2 on the opening side of the shade 3A), respectively. The multi functional stoppers 6B, 6B in the sunshade device 1B are attached to the front ends of the shade guide rails 2 (the ends of the shade guide rails 2 on the opening side of the shade 3B).

Figure 6A:
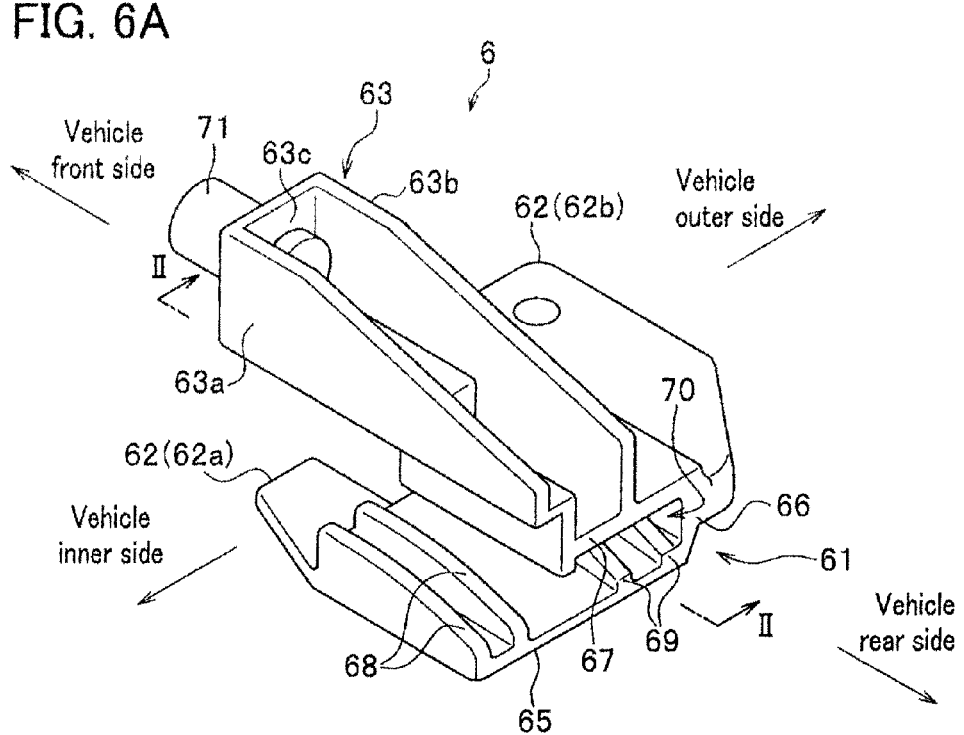
FIG. 6A is a perspective view showing the multifunctional stopper seen from the vehicle rear side.
Figure 6B:
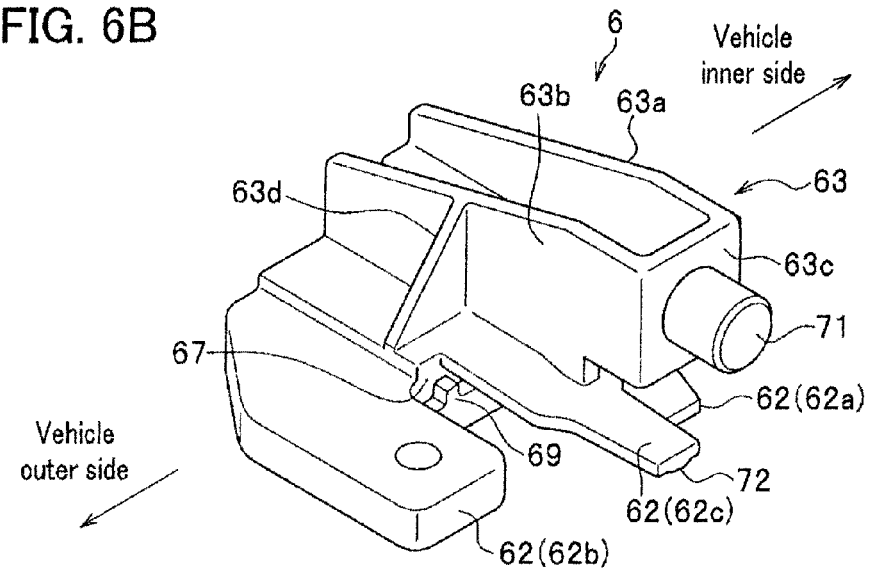
FIG. 6B is a perspective view showing the multifunctional stopper seen from the vehicle front side.

The multi functional stopper 6 is mainly comprised of a base body portion 61 whose cross sectional shape is a substantially laid U shape; three engaging portions 62 protruding from the base body portion 61; and a restriction portion 63 formed on the base body portion 61 as shown in FIGS. 6A and 6B.

The base body portion 61 includes: a bottom portion 65; an erected wall portion 66 erecting vertically from the vehicle outside portion of the bottom portion 65; and a center portion 67 extending toward the vehicle inner side from the erected wall portion 66.

Figure 7A:
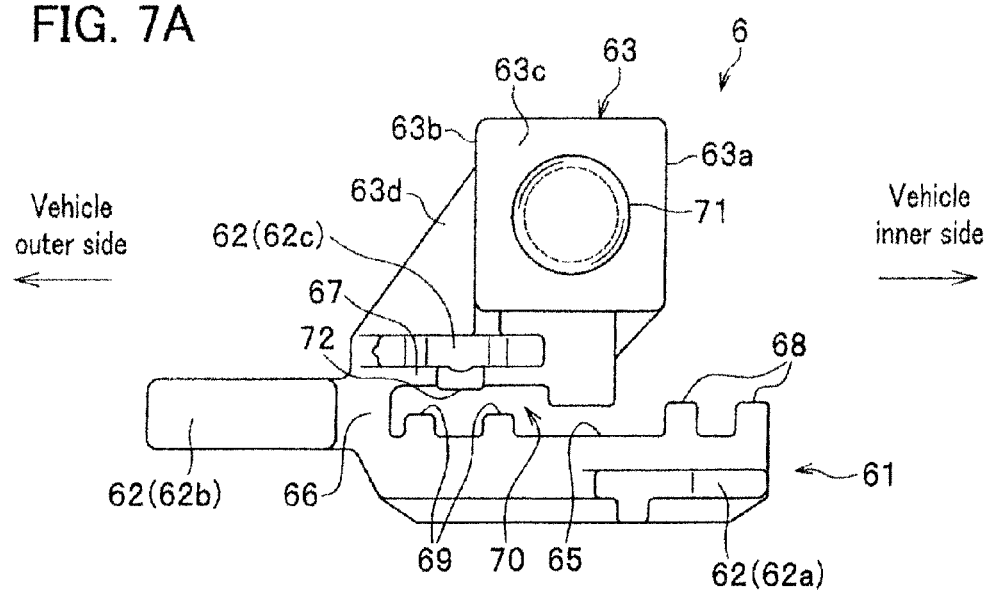
FIG. 7A is a front view of the multifunctional stopper.

The bottom portion 65 includes a pair of first introduction wall portions 68 formed in the vehicle inner side portion of the bottom portion 65 and a pair of second introduction wall portions 69 formed in the vehicle outer side portion of the bottom portion 65 as shown in FIGS. 6A and 6B. The first introduction wall portion 68 and the second introduction wall portion 69 erect vertically on the bottom portion 65 and are arranged in parallel with each other in the width direction of multi functional stopper 6 with some space therebetween. As shown in FIG. 7A, the upper part of the first introduction wall portion 68 is opened, and the upper part of the second introduction wall portion 69 is covered by the center portion 67. The first introduction wall portion 68 is formed to be a little higher than the second introduction wall portion 69.

Figure 7B:
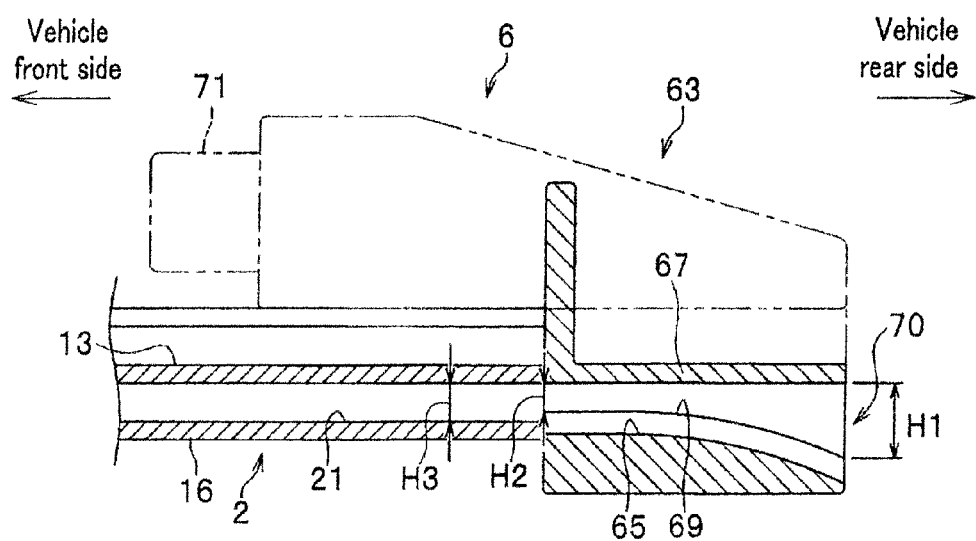
FIG. 7B is a side cross sectional view of the multifunctional stopper.

The first introduction wall portion 68 and the second introduction wall portion 69 extend in the vehicle front-rear direction (the opening and closing direction of the shade 3), and the height of the first introduction wall portion 68 and the second introduction wall portion 69 is gradually lowered toward the vehicle rear side. More specifically, the upper ends of the first introduction wall portion 68 and the second introduction wall portion 69 are formed in a curved surface (inclined surface) protruding upward. With this structure, the height H1 from the second introduction wall portion 69 to the center portion 67 at the rear end of the second introduction wall portion 69 (the end of the second introduction wall portion 69 on the opening side of the shade 3) is made greater than the height H2 from the second introduction wall portion 69 to the center portion 67 at the front end of the second introduction wall portion 69 (the end of the second introduction wall portion 69 on the closing side of the shade 3) as shown in FIG. 7B. It is to be noted that the height H2 is made smaller than the height H3 of the groove portion 21 of the shade guide rail 2.

The erected wall portion 66 is a portion which is erected on the end of the bottom portion 65 on the vehicle outer side as shown in FIG. 6A. The center portion 67 is perpendicular to the erected wall portion 66 and extends toward the vehicle inner side from the inner surface of the erected wall portion 66. With this structure, the base body portion 61 is formed in a substantially laid U shape in a cross section, and the hollow part of the base body portion 61 functions as a folding guide groove 70 which folds the side edge of the shade 3.

The engaging portion 62 includes a first engaging portion 62*a*, a second engaging portion 62*b* and a third engaging portion 62*c* in the embodiment as shown in FIGS. 6A and 6B. The engaging portion 62 is a part which is engaged with the rear end of the shade guide rail 2 (the end of the shade guide rail 2 on the opening side of the shade 3).

The first engaging portion 62*a* is a plate member protruding toward the vehicle front side from the vehicle inner side portion of the bottom portion 65. The first engaging portion 62a becomes narrower toward its distal end.

The second engaging portion 62b is a plate member protruding toward the vehicle outer side and the vehicle front side from the outer side surface of the erected wall portion 66. The third engaging portion 62c is a plate member protruding toward the vehicle front side from the center portion 67. The third engaging portion 62c becomes narrower toward its distal end. Formed on the lower surface of the third engaging portion 62c is an engaging protrusion 72 (see FIG. 7A) protruding downward.

The restriction portion 63 is a portion for regulating the movement of the shade 3 at the completely-opened position of the shade 3 as shown in FIGS. 6A and 6B. The restriction portion 63 includes: a pair of side wall portions 63a, 63b erected on the center portion 67; a front face portion 63c which connects the front ends of the side wall portions 63a, 63b; and a horizontal rib 63d which connects the side wall portion 63b and the center portion 67.

In the embodiment, a circular hole is formed on the front face portion 63c, and a buffer member 71 is fit into the circular hole. The buffer member 71 is a member which buffers an impact applied when the supporting bracket (contact portion) 42 comes in contact with the multi functional stopper 6 when the shade 3 is completely opened. The buffer member 71 is formed, for example, of rubber. The buffer member 71 may be provided as necessary.

Figure 8A:
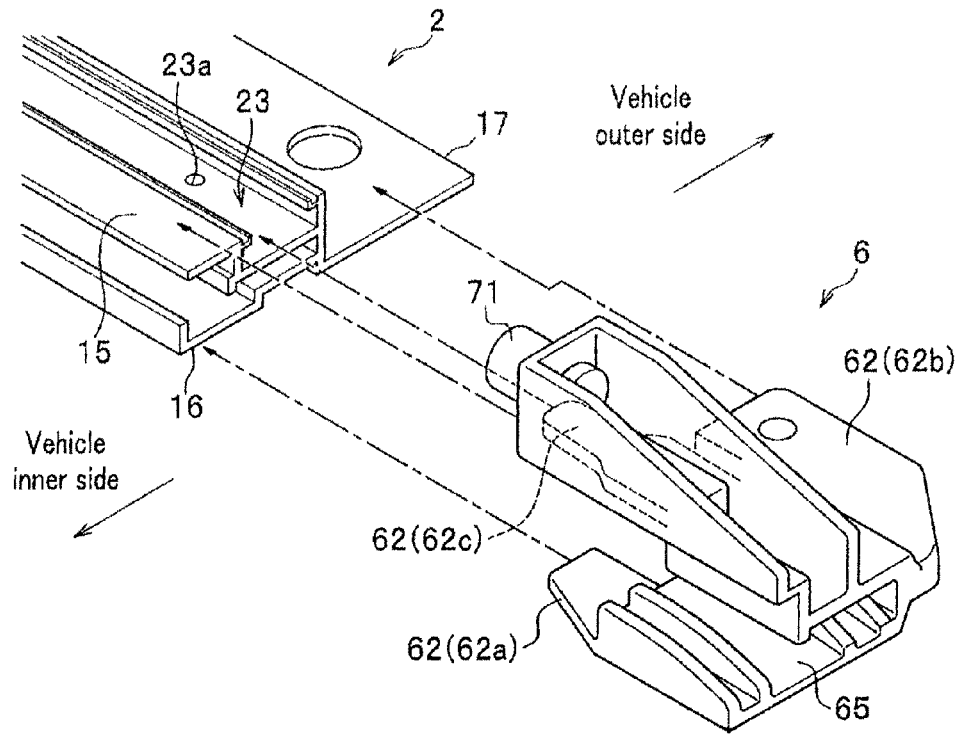
FIG. 8A is a perspective view showing how the multifunctional stopper is assembled to the shade guide rail.
Figure 8B:
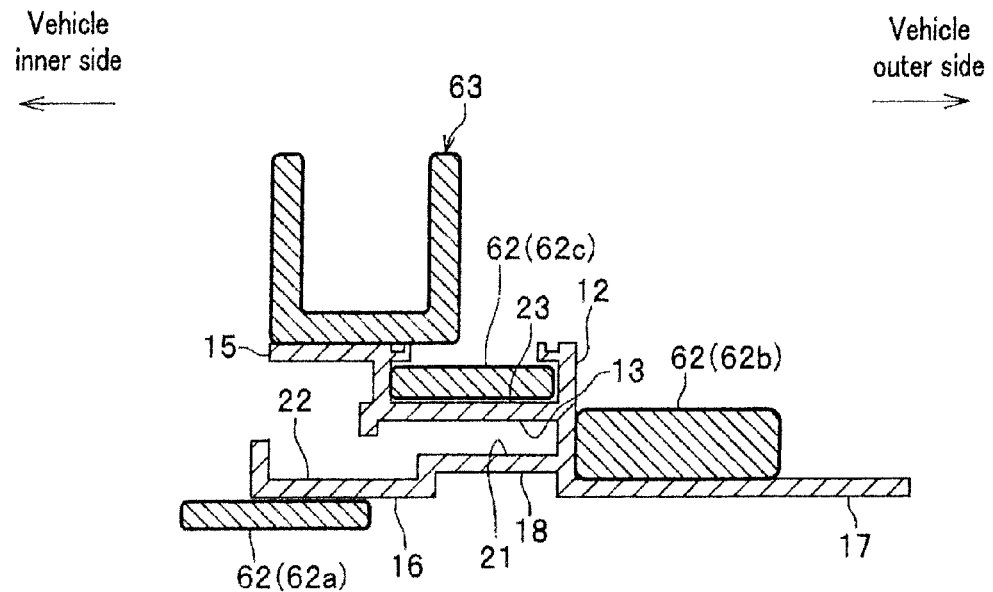
FIG. 8B is a cross sectional view showing the multifunctional stopper which has been assembled to the shade guide rail.

Next, a method for assembling the sunshade device 1 is described. After the folded introduction part 31 is formed in the shade 3 as shown in FIGS. 4A and 4B, the slide shoo 41 is inserted into the sliding part 22 from the rear end of the shade guide rail 2 (the end of the shade guide rail 2 on the opening side of the shade 3) provided to the fixed roof R1 and only the folded introduction part 31 is inserted into the groove portion 21. In this state, the multi functional stopper 6 is engaged with the rear ends of the shade guide rail 2 as shown in FIGS. 8A and 8B. It is to be noted that the shade 3 is omitted in FIGS. 8A and 8B.

More specifically, the first engaging portion 62a is brought into contact with the lower surface of the first bottom plate portion 16 of the shade guide rail 2, the second engaging portion 62b is brought into contact with the upper surface of the second bottom plate portion 17 and the side surface of the outer wall portion 12 of the shade guide rail 2, and the third engaging portion 62c is brought into contact with the middle plate portion 13 as shown in FIGS. 8A and 8B. The third engaging portion 62c is fit into the engaging groove 23 whose bottom surface is the middle plate portion 13 and the engaging protrusion 72 (see FIG. 7A) formed at the distal end of the third engaging portion 62c is engaged with a recessed portion 23a formed in the engaging groove 23. With this structure, the position of the multi functional stopper 6 is determined. Further, the lower surface of the restriction portion 63 comes in contact with the upper surface of the upper plate portion 15. Thus, the multi functional stopper 6 is assembled in the shade guide rail 2.

As shown in FIG. 7B, the folding guide groove 70 and the groove portion 21 of the shade guide rail 2 are communicated with each other when the multi functional stopper 6 is engaged with the shade guide rail 2. The upper end of the second introduction wall portion 69 is positioned above the upper surface of the groove portion 21. The lower surface of the center portion 67 is flushed with the lower surface of the middle plate portion 13. It is preferable that the upper end of the second introduction wall portion 69 is flushed with the upper surface of the groove portion 21 or is positioned above the upper surface of the groove portion 21. Further, it is preferable that the lower surface of the center portion 67 is flushed with the middle plate portion 13 or is positioned below the middle plate portion 13. More specifically, with the structure in which the end of the shade guide rail 2 is not exposed when the multi functional stopper 6 is engaged with the shade guide rail 2 it is possible to prevent the shade 3 from being caught by the end of the shade guide rail 2.

Further, the multi functional stopper 6 can be removed easily from the shade guide rail 2 by pulling the multi functional stopper 6 toward the vehicle rear side while removing the engaging protrusion 72 from the recessed portion 23a of the engaging groove 23.

Figure 9A:
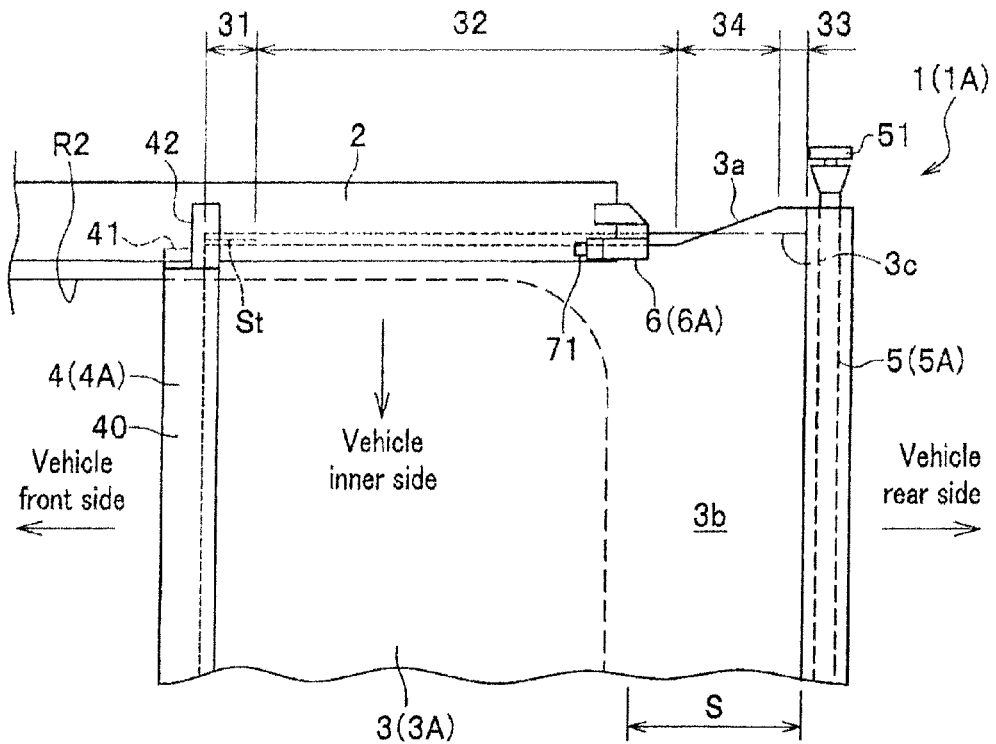
FIG. 9A is a schematic plain view showing the effect of the sunshade device in which the shade is closed completely.
Figure 9B:
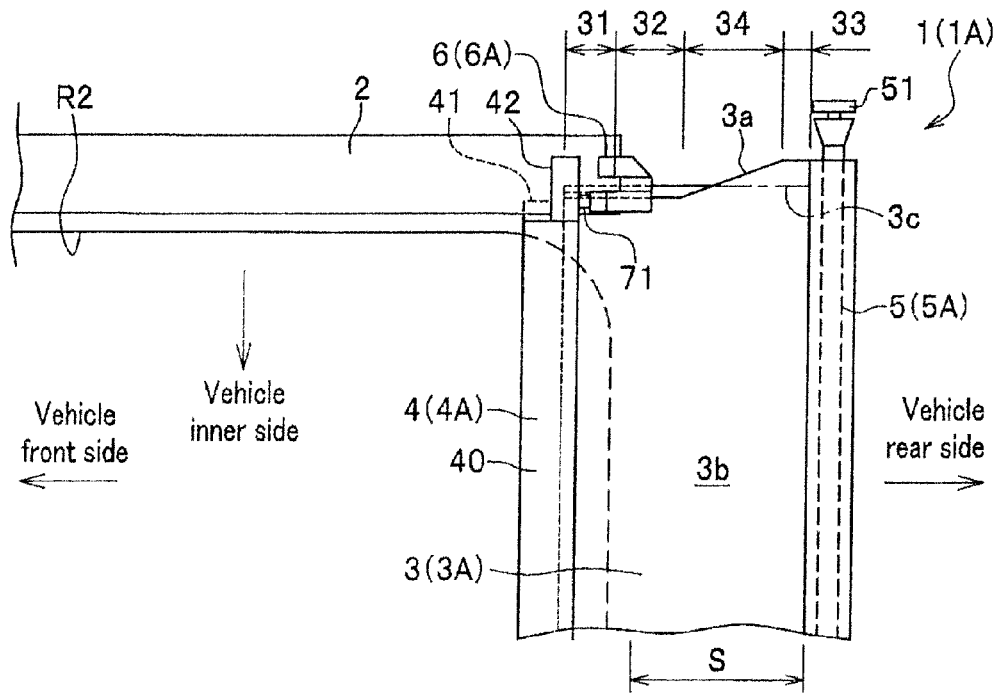
FIG. 9B is a schematic plain view showing the effect of the sunshade device in which the shade is opened completely.

Next, the effect of the sunshade device 1 is described below. FIG. 9A is a schematic plain view showing the effect of the sunshade apparatus when the shade 3 is closed completely. FIG. 9B is a schematic plain view showing the effect of the sunshade apparatus when the shade 3 is opened completely. As shown in FIG. 9A, when a passenger moves the handle 4 to the vehicle front side, the shade 3 is drawn out from the winding shaft 5 and the indoor opening R2 is covered by the shade 3. The side edge of the shade 3 is folded by the time when the side edge of the shade 3 is inserted into the shade guide rail 2 from the time when the shade 3 is started to be drawn out, and the shade 3 is moved in the shade guide rail 2 with the side edge of the shade 3 being folded.

As shown in FIG. 9A, the side edge of the shade 3 is classified into 4 parts when the shade 3 is drawn out. The part indicated by the reference numeral 31 is a "folded introduction part" described before. The folded introduction part 31 is kept folded since the side edge portion 3a is sewn. The part indicated by the reference number 32 is a "fold part". The fold part 32 is a part which gets folded by being inserted into the shade guide rail 2.

The part indicated by the reference numeral 33 is "non-folded part" in which the side edge portion 3a is not folded immediately after the shade 3 is drawn out from the winding shaft 5. The part indicated by the reference numeral 32 is a "folding stroke". The folding stroke 34 is a part formed between the non-folded part 33 and the fold part 32, and the width of the folded portion of the folding stroke 34 is gradually increased toward the leading end (the vehicle front side) of the shade 3.

As described in the embodiment, the shade 3 drawn out from the winding shaft 5 is guided by the shade guide rail 2 with its opposed edges being folded after the folding stroke 34 and opens or closes the indoor opening R2 in the vehicle front-rear direction.

By forming the fold part 32 which is folded upward as shown in FIG. 3, restoring force of the side edge of the shade 3 to return to its original state is exerted continuously over the entire fold part 32. Therefore, even if a part of the side edge of the shade 3 is likely to be removed from the shade guide rail 2 by the external force applied to the shade 3 from the vehicle inner side, for example, the restoring force exerted around the part of the shade likely to be removed acts to pull the side edge of the shade 3 to return to the shade guide rail 2. Thus, the side edge of the shade 3 is difficult to be removed from the shade guide rail 2.

When a passenger moves the handle 4 toward the vehicle rear side, the shade 3 is wound around the winding shaft 5 and the indoor opening R2 is opened as shown in FIG. 9B. The position where the supporting bracket (contact portion) 42 of the handle 4 is in contact with the buffer member 71 of the multi functional stopper 6 is the completely-opened position of the shade 3.

Figure 10:
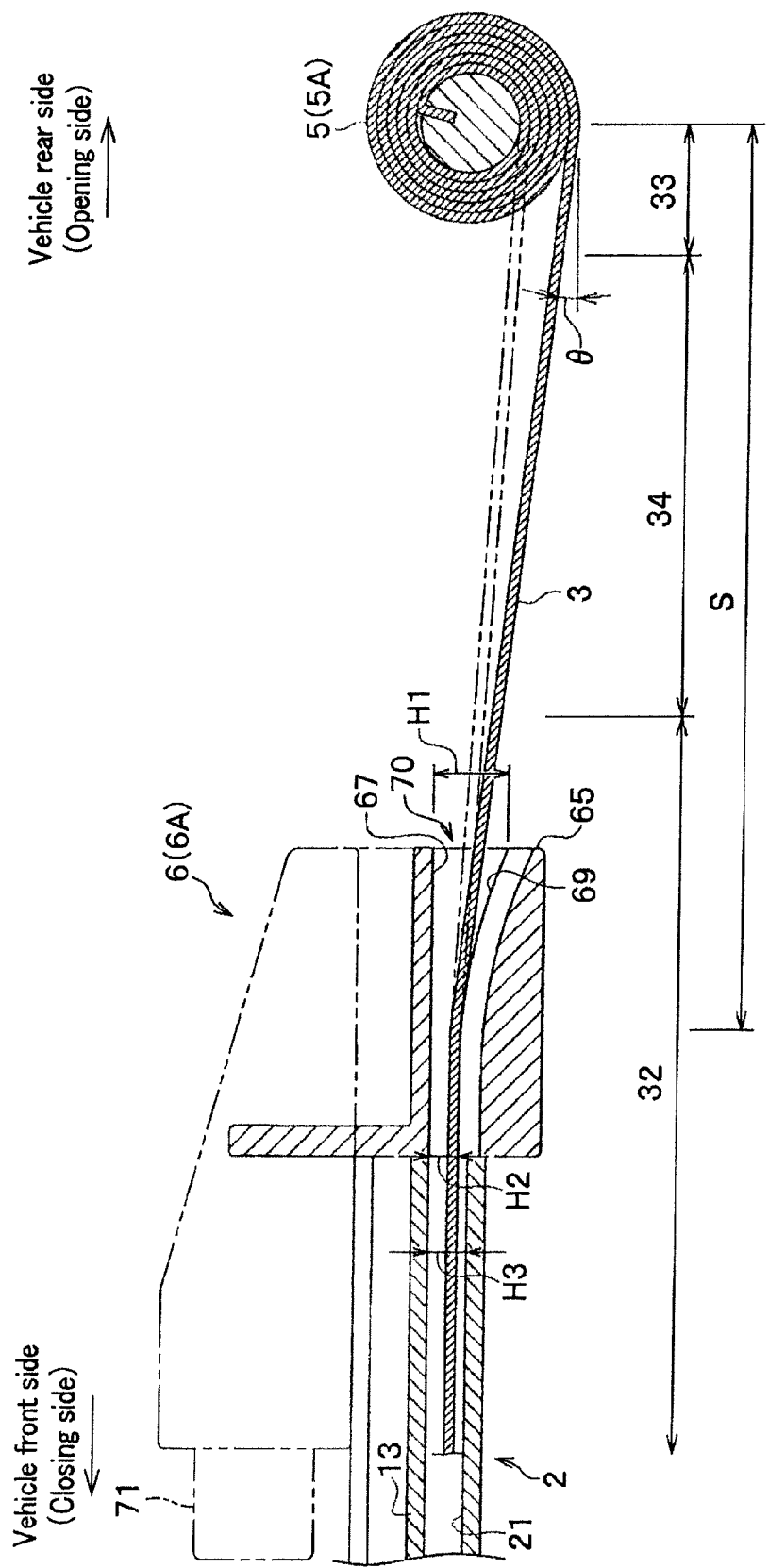
FIG. 10 is a side cross sectional view of the sunshade device showing the effect of the sunshade device.

Here, the part indicated by the reference symbol S in FIGS. 9A and 9B is an "inclination changing space". In a structure where the shade 3 is wound around the winding shaft 5 like a roll, the inclination changing space S inclined in a side view is formed on a path of the shade 3 immediately after the shade 3 is drawn out from the winding shaft 5 as shown in FIG. 10. In FIG. 10, a drawing path of the shade 3 when most of the shade 3 is wound around the winding shaft 5 is indicated by a solid line and a drawing path of the shade 3 when only a little of the shade 3 is wound is indicated by a virtual line.

As described above, the inclination changing space S is inevitably formed between the winding shaft 5 and the shade guide rail 2. However, if the dimension of the inclination changing space S in the vehicle front-rear direction is shortened (i.e. if the space between the winding shaft 5 and the shade guide rail 2 is shortened), the inclination angle θ of the shade 3 is made larger. If the inclination angle θ is made larger, the component in the vertical direction is also made larger. Therefore, the loss of the operational weight by the handle 4 (see FIGS. 9A and 9B) in the horizontal direction becomes larger, whereby larger manual operation force needs to be applied to the handle 4. Thus, the dimension of the inclination changing space S in the vehicle front-rear direction needs to be large enough. In a case of the embodiment in which the folding stroke 34 is formed, a dimension of the inclination changing space S in the vehicle front-rear direction needs to be more than that of the folding stroke 34.

In accordance with the sunshade device 1 according to the embodiment described above, a process of folding the side edge portion 3a of the leading end of the shade 3 can be omitted when the leading end of the shade 3 is inserted into the shade guide rail 2 since the folded introduction part 31 is formed along the opposite edges of the shade 3 in advance. As a result, it is possible to easily assemble or restore the shade 3 to the shade guide rail 2.

Furthermore, since the fold line 3c is formed along the opposite sides of the main body 3b of the shade 3, the fold line 3 can be instrumental in folding the opposite sides of the main body 3b, and the shade 3 can be folded in a desired position.

Further, in the embodiment, as the supporting bracket 42 comes in contact with the buffer member 71 (the restriction portion 63) of the multi functional stopper 6, the movement of the shade 3 can be restricted by the completely opened position of the shade 3. As shown in FIG. 10, the folding guide groove 70 is communicated with the groove portion 21 of the shade guide rail 2 and the height H1 of the opening provided at the end of the folding guide groove 70 on the rear side of the shade 3 (on the opening side of the shade 3) is adapted to be larger than the height 3 of the groove portion 21. Thus, the shade 3 whose side edge is folded is guided by the folding guide groove 70 and is smoothly inserted into the shade guide rail 2. With this structure, the folded width of the fold part 32 of the shade 3 can be made constant.

The height H2 of the opening provided at the end of the folding guide groove 70 on the front end side of the shade 3 (on the closing side of the shade 3) is adapted to be smaller than the height 3 of the groove portion 21 and the end of the shade guide rail 2 is not exposed. With this structure, the shade 3 can be prevented from being damaged due to the contact between the shade 3 and the end of the shade guide rail 2 since the shade 3 does not come into contact with the end of the shade guide rail 2.

Further, the first introduction wall portion 68 and the second introduction wall portion 69 of the multi functional stopper 6 are formed to be gradually lowered toward the vehicle rear side (on the opening side of the shade) as shown in FIG. 10, which makes it easy to guide the shade 3. More specifically, although the inclination angle of the shade 3 in a side view is varied depending on the length of the shade 3 wound around the winding shaft 5, the shade 3 can be smoothly guided because the upper faces of the first introduction wall portion 68 and the second introduction wall portion 69 are formed in a curved surface which is lowered toward the vehicle rear side (the opening direction of the shade). With this structure, the friction resistance between the shade 3 and the first introduction wall portion 68 and the second introduction wall portion 69 due to the variation in the inclination angle of the shade 3 can be reduced.

Further, by erecting the plurality of the first introduction wall portions 68 and the second introduction wall portions 69 of the multi functional stopper 6 with some space being provided therebetween in the width direction, the friction between the shade 3 and the first introduction wall portions 68 and the second introduction wall portions 69 can be made smaller, whereby the shade 3 can be prevented from being worn.

Figure 11:
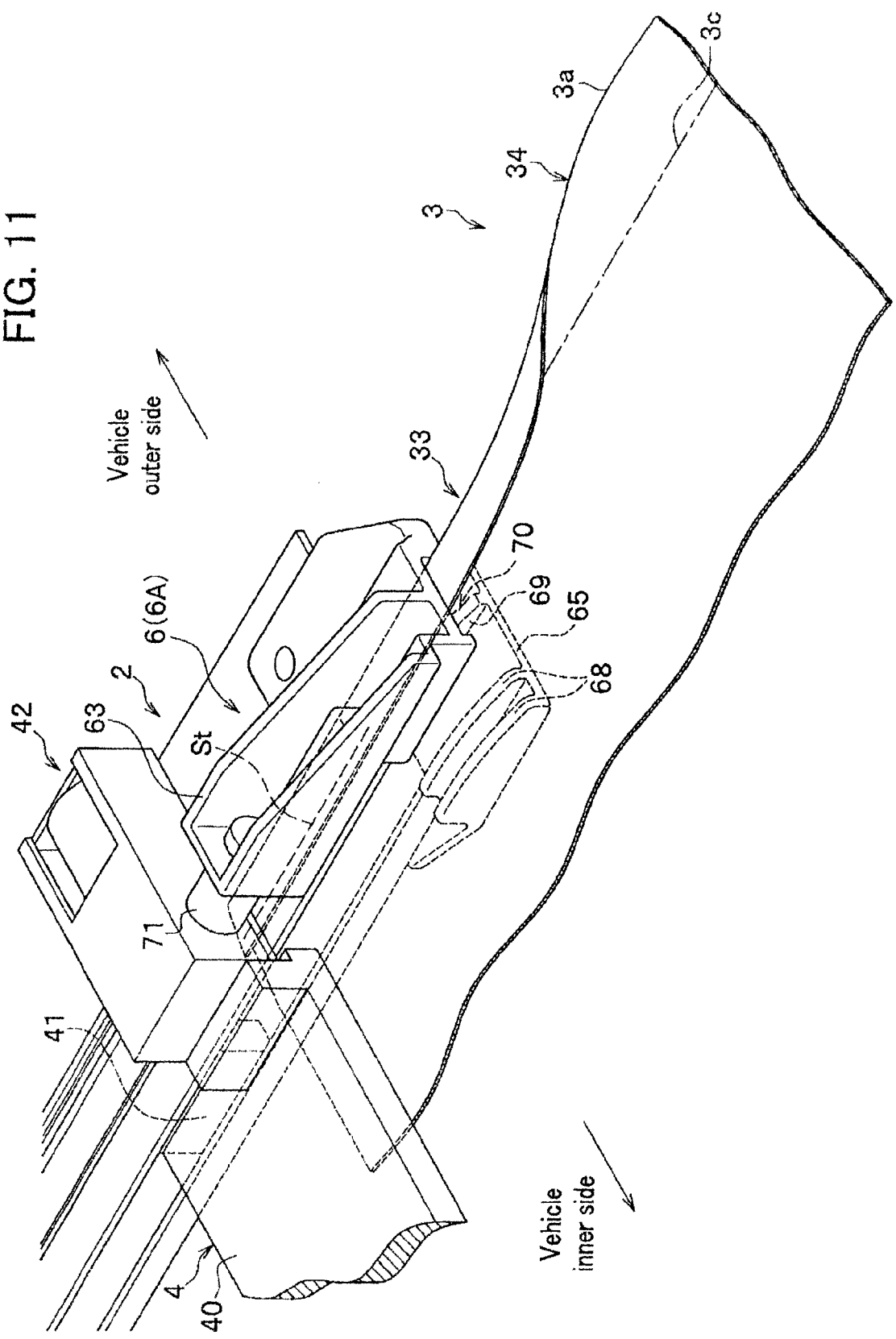
FIG. 11 is a perspective view of the sunshade device showing the effect of the sunshade device.

Even if a part of the shade 3 is removed from the shade guide rail 2 due to external force from the cabin in the embodiment, the shade 3 can be easily restored by moving the handle 4 to the completely-opened position (i.e. the position where the supporting bracket 42 comes in contact with the buffer member 71 (the restriction portion 63)) of the multi functional stopper 6 once and then withdrawing the shade 3 again as shown in FIG. 11. The twisted part of the shade 3 can be restored since the most part of the shade 3 is wound around the winding shaft 5 in the completely opened position. Further, the shade 3 can be guided by the shade guide rail 2 again just by withdrawing the handle 4 from the completely-opened position since the folded introduction part 31 is positioned in the folding guide groove 70 at the completely-opened position.

The embodiment of the present invention has been described as above, however, the present invention may be modified as appropriate within a sprit of the present invention. For example, a pair of sunshade devices 1A, 1B is provided in the vehicle front-rear direction in the embodiment, however, either one of the sunshade devices 1A, 1B is provided and make it to cover entire part of the indoor opening R2. Further, the shade 3 is opened or closed in the vehicle front-rear direction in the embodiment, however, the shade may be opened or closed in the width direction of the vehicle.

Furthermore, the supporting bracket 42 formed in the handle 4 is brought into contact with the restriction portion 63 in the embodiment, however, an embodiment of the present invention is not limited to this. For example, an embodiment may be employed in which at least a part of the handle 4 and a part of the multi functional stopper 6 (a restriction part) come in contact with each other as long as the movement of the handle 4 is restricted. For example, a part of the multi functional stopper 6 which faces to the sliding part 22 may be provided with a part for restricting the movement of the slide shoo 41 (restriction part) and the slide shoo 41 is brought in contact with the restriction part.

What is claimed is:

1. A sunshade device which is provided to a fixed roof of a vehicle, the sunshade device comprising:
    a pair of shade guide rails which is provided on opposite sides of an indoor opening device across the indoor opening of the fixed roof;
    a shade of which opposite side edges are guided by the shade guide rails to open or close the indoor opening; and
    a winding shaft which rolls up the shade,
    wherein each of the opposite side edges of the shade is guided by the shade guide rail with the side edge being folded through a folding stroke whose folded width is gradually increased toward a leading end of the shade when the shade is drawn out from the winding shaft, the each of the opposite side edges of the shade is provided in advance with a folded introduction part that is formed by folding a side edge portion of the shade and connecting the folded side edge portion to a main body portion of the shade, the folded introduction part is formed in a predetermined length from the leading end of the shade in an open/close direction of the shade, a handle which is attached to the leading end of the shade and includes slide shoes which are slid in the shade guide rails, and multifunctional stoppers which are provided at ends of the shade guide rails on an opening side of the shade, wherein each of the multifunctional stopper includes a restriction portion which comes in contact with the handle at a completely-opened position of the shade and a base body portion including a folding guide groove through which the folded side edge of the shade is inserted, the folding guide groove being communicated with a groove portion of the shade guide rail, and wherein a height of an opening of the folding guide groove on the opening side of the shade is larger than a height of the groove portion.

2. The sunshade device according to claim 1, wherein a folded line for folding the side edge portion of the shade is formed on each opposite side of the main body portion of the shade, and the folded line is formed in the open/close direction of the shade.

3. The sunshade device according to claim 1, wherein the folded introduction part is formed by sewing the side edge portion of the shade and the main body portion of the shade together.

4. The sunshade device according to claim 1, wherein the shade guide rail includes a groove portion accommodating a folded portion which is formed by folding the shade, and wherein the groove portion includes a rib portion which extends in a vertical direction at a position inside of the vehicle relative to the folded portion.

5. The sunshade device according to claim 1, wherein the base body portion includes a bottom portion which forms a lower portion of the folding guide groove, wherein the bottom portion being inclined downward toward the opening side of the shade.

6. The sunshade device according to claim 1, wherein the height of the opening of the folding guide groove on the closing side of the shade is smaller than the height of the groove portion.

7. The sunshade device according to claim 5, wherein the height of the opening of the folding guide groove on the closing side of the shade is smaller than the height of the groove portion.

* * * * *